United States Patent [19]
Ruiz

[11] 3,883,360
[45] May 13, 1975

[54] GROUTING COMPOSITION AND METHOD
[75] Inventor: Alvaro L. Ruiz, Madrid, Spain
[73] Assignee: Hayward Baker Company, Northbrook, Ill.
[22] Filed: Oct. 25, 1972
[21] Appl. No.: 300,783

Related U.S. Application Data
[63] Continuation of Ser. No. 102,265, Dec. 28, 1970, abandoned, which is a continuation-in-part of Ser. No. 694,807, Jan. 2, 1968, abandoned.

[52] U.S. Cl. ................ 106/74; 106/84; 106/287 SS
[51] Int. Cl. ......................... C04b 35/16; E02d 3/00
[58] Field of Search ........ 106/74, 84, 38.35, 287 SS

[56] References Cited
UNITED STATES PATENTS
| | | | |
|---|---|---|---|
| 3,306,756 | 2/1967 | Miller | 106/74 |
| 3,493,406 | 2/1970 | Fillet et al. | 106/84 |
| 3,558,506 | 1/1971 | Bonnel et al. | 106/74 |

Primary Examiner—J. Poer
Attorney, Agent, or Firm—McDougall, Hersh & Scott

[57] ABSTRACT

A grouting composition for use in contacting the soil whereby the soil will become stabilized. The composition, based on a liter of solution, consists of from 350 to 675 cc of alkali metal silicate having an alkali metal oxide:silicon dioxide ratio of about 1:3 to 1:5 and having a solids content between 30 and 45 weight percent; from about 25 to 200 cc of an amide of the structure

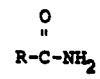

wherein R is selected from the group consisting of hydrogen, lower alkyl, —$CONH_2$, and lower alkyl-substituted amide groups, from 5 to 50 cc of an ester which is soluble in said amide; and the balance water.

5 Claims, No Drawings

GROUTING COMPOSITION AND METHOD

This application is a continuation of application Ser. No. 102,265, filed Dec. 28, 1970, now abandoned, which was a continuation-in-part of application Ser. No. 694,807, filed Jan. 2, 1968, now abandoned.

This invention relates to improved compositions and method to be used in grouting whereby stabilization of soil can be achieved.

There are many known applications for the use of grouting materials. For example, grouting materials are included in the soil for purposes of stabilizing the soil whereby the soil will be sealed against the movement of liquids. In addition, the grouting material is used in order to facilitate excavation. In the latter case, the grouting material is usually employed where relatively non-cohesive or granular soil is encountered during excavating. By undertaking a grouting operation in the peripheral areas of the intended excavation, cave-in of the soil can be minimized as the excavation proceeds. Similar grouting operations are undertaken when digging tunnels.

Peeler U.S. Pat. No. 2,968,572 discloses grouting compositions employed for the solidification or stabilization of soil. In accordance with the disclosure of this patent, the grouting compositions consist of an alkali metal silicate, such as sodium silicate in combination with an amide, such as formamide, and a reactive salt, such as calcium chloride. In the use of the Peeler composition, the soil is contacted with the liquid mixture, usually by sub-soil injection. The mixture gels after a period of time with the final gel comprising a product of relatively high strength and fluid impermeability.

It is a general object of this invention to provide improvements in grouting compositions, particularly improvements in compositions of the type described in the aforementioned Peeler patent.

It is a further object of this invention to provide an improved grouting composition and method for its use which provides increased economy from the standpoint of the cost and availability of materials employed in the composition and from the standpoint of ease of penetration into the soil, and which is characterized by other improved features.

These and other objects of this invention will appear hereinafter, and it will be understood that specific embodiments hereinafter set forth are provided primarily for purposes of illustration, and are not intended as limitations of the invention.

The concepts disclosed in the aforementioned Peeler patent provide definite advantages in grouting systems. The materials are relatively easy to handle, and satisfactory strengthening of the soil can be achieved.

It has been found, however, that the compositions referred to have certain disadvantages in practice. Specifically, the compositions form a colloidal suspension and frequently flocs whereby certain difficulties arise to impede flow of the composition into the soil. Thus, the movement of the liquid is impeded to a degree by the colloidal particles whereby a relatively slow rate of impregnation of the soil characterizes the process. Furthermore, the material is characterized by a significant ammonia odor which makes it uncomfortable for the workmen involved in excavating the grouted mass.

It has been found that improvements in the compositions referred to are obtained when significant amounts of ethyl acetate are utilized along with certain of the materials utilized by Peeler; however, reactive salts of the type recommended by Peeler are not employed. Specifically, the improved composition of this invention based on a liter of solution, consists of from 350 to 675 cc of alkali metal silicate having an alkali metal oxide:silicon dioxide ratio of about 1:3 to 1:5 and having a solids content between 30 and 45 weight percent; from about 30 to 200 cc of an amide of the structure

wherein R is selected from the group consisting of hydrogen, lower alkyl, $-CONH_2$, and lower alkyl-substituted amide groups, from 5 to 50 cc of an ester which is soluble in said amide; and the balance water.

As in the case of the Peeler patent, the alkali metal silicate preferably comprises sodium silicate. Silicates of potassium and sodium are more generally available, and sodium silicates are preferred because of their lower cost and greater availability.

Formamide represents the preferred amide; however, R may be selected from the group consisting of hydrogen, lower alkyl groups such as methyl, ethyl, and other amides soluble in water.

In addition to ethyl acetate, other esters which are soluble in the selected amide may be employed. Examples of such other esters are methyl formate, ethyl formate, methyl acetate and combinations of these and other suitable esters. Ethyl acetate is the preferred ester, and this ester is preferably employed in amounts from 5 to 50 cc.

Extensive tests have been conducted relative to the use of compositions falling within the scope of the instant invention. The following tables illustrate the results of these tests:

Table 1

| 400 cc per liter of sodium silicate | | | Gel time (Min.) | T (°C) | P. Strength at 24h | P.Strength at 48h, kg/cm² |
|---|---|---|---|---|---|---|
| Ac | W | F | | | | |
| 20 | 520 | 60 | 110 | 21 | 0.8 | 1.5 |
| 20 | 500 | 80 | 60 | 25 | 1.3 | 1.8 |
| 20 | 480 | 100 | 50 | 20 | 1.2 | 1.7 |
| 25 | 500 | 75 | 45 | 20 | 1.3 | 2.0 |
| 24 | 480 | 96 | 23 | 25 | 1.4 | 1.8 |
| 23.5 | 460 | 116.5 | 20 | 19.5 | 1.7 | 2.2 |
| 30 | 480 | 90 | 15 | 20 | 1.8 | 2.4 |
| 28 | 460 | 112 | 10 | 25 | 2.1 | 2.6 |
| 26.7 | 440 | 133.3 | 4.5 | 19.5 | 3.0 | 4.4 |

Table 2

| 500 cc per liter of sodium silicate | | | Gel time (Min.) | T (°C) | P Strength at 24h | P. Strength at 48h, kg/cm² |
| --- | --- | --- | --- | --- | --- | --- |
| Ac | W | F | | | | |
| 16 | 420 | 64 | 105 | 20 | 3.0 | 5.0 |
| 20 | 420 | 60 | 70 | 24 | 3.0 | 5.0 |
| 16.7 | 400 | 83.3 | 55 | 21 | 3.0 | 5.0 |
| 20 | 400 | 80 | 48 | 19.5 | 3.5 | >5.0 |
| 25 | 400 | 75 | 25 | 23 | 3.5 | >5.0 |
| 20 | 380 | 100 | 20.5 | 20 | 3.5 | >5.0 |
| 24 | 380 | 96 | 12 | 19 | 4.0 | >5.0 |
| 30 | 380 | 90 | 3 | 23 | 4.0 | >>5.0 |
| 23.5 | 360 | 116.5 | 3 | 20.5 | 5.0 | >>5.0 |

Table 3

| 600 cc per liter of sodium silicate | | | Gel time (Min.) | T (°C) | P. Strength at 24h | P. Strength at 48h, kg/cm² |
| --- | --- | --- | --- | --- | --- | --- |
| Ac | W | F | | | | |
| 13.7 | 320 | 66.3 | 170 | 18 | 4.5 | >>5.0 |
| 12.5 | 300 | 87.5 | 93 | 22 | 4.5 | >>5.0 |
| 14.3 | 300 | 85.7 | 70 | 19 | 4.8 | >>5.0 |
| 8.6 | 280 | 111.4 | 60 | 18 | 5.0 | >>5.0 |
| 16.7 | 300 | 83.3 | 60 | 17.5 | 5.0 | >>5.0 |
| 9.3 | 270 | 120.7 | 40 | 18 | 4.7 | >>5.0 |
| 12.0 | 280 | 108 | 35 | 17 | 4.7 | >5.0 |
| 15.0 | 280 | 105 | 24 | 19 | 4.4 | >>5.0 |
| 17.1 | 280 | 102.9 | 15 | 19 | 5.0 | >>5.0 |
| 13.0 | 270 | 117.0 | 12 | 17.5 | 5.0 | >>5.0 |
| 10.0 | 260 | 130 | 8 | 18 | 5.0 | >>5.0 |
| 14.0 | 260 | 126 | 1.5 | 17 | 5.0 | >>5.0 |
| 17.5 | 260 | 122.5 | 1.5 | 19 | 5.0 | >>5.0 |
| 20.0 | 280 | 100 | 2 | 17.5 | 5.0 | >>5.0 |
| 20.0 | 260 | 120 | 0.5 | 20 | 5.0 | >>5.0 |

In the above examples, which were set forth in the application Ser. No. 694,807, the amount of formamide exceeds the amount of ethyl acetate. It has now been found, however, that improved operating conditions can be achieved when the amount of amide is substantially reduced to a point substantially equal to or less than the amount of acetate. For example, acetate up to about 1½ times the amount of formamide can be employed with surprisingly effective results. This is very advantageous since ethyl acetate is more readily available under certain circumstances than formamide, and the reduction in formamide, therefore, leads to a lower cost for the over-all operation. Furthermore, the reduction in the amount of formamide employed reduces ammonia generation which is a very important factor particularly where there is relatively poor circulation which tends to allow build-up of generated ammonia.

In practice, the formamide or other amide is employed in amounts between 25 and 60 cc in accordance with this preferred form of the invention. The following comprise typical examples of such compositions:

Table 4

| 600 cc per liter of sodium silicate | | | Gel time (Min.) | T (°C) | P Strength at 24h | P. Strength at 48h, kg/cm² |
| --- | --- | --- | --- | --- | --- | --- |
| Ac | W | F | | | | |
| 30 | 340 | 30 | 25 | 25 | 5.0 | 5.0 |
| 35 | 330 | 35 | 13 | 25 | 5.0 | 5.0 |
| 40 | 320 | 40 | 4.5 | 25 | 5.0 | 5.0 |
| 35 | 340 | 25 | 15 | 24 | 5.0 | 5.0 |
| 40 | 330 | 30 | 7 | 24 | 5.0 | 5.0 |
| 45 | 325 | 30 | 2 | 24 | 5.0 | 5.0 |

In the above tables, "Ac" refers to the amount of ethyl acetate in cc per liter; "W" refers to the amount of water in cc per liter; "F" refers to the amount of formamide in cc per liter; "P. strength" refers to the amount of penetration strength in kg per square cm after 24 hours and after 48 hours, respectively. The maximum penetration strength of the pocket penetrometer used was 5.0 kg/cm².

Compositions falling within the scope of the instant invention have certain characteristics which are extremely important from the standpoint of grouting operations. Specifically, these compositions form a true solution when initially mixed as opposed to a colloidal suspension. Accordingly, the grouting operation can be carried out very rapidly thereby saving time and expense. The operation has been found to be approximately twice as fast as an operation involving the use of compositions of the type described in the Peeler patent.

As indicated, the reduction of the amount of formamide in the preferred compositions also considerably reduces the formation of ammonia. Accordingly, the compositions are easier to work with as far as the comfort of the workmen is concerned. Furthermore, there is no need to add reactive salts, such as calcium chlorides, to the compositions of this invention. These reactive salts when mixed with the sodium silicate produce colloidal suspensions and frequently flocs thereby plugging pores in the soil and also the pipes and bit parts of the grouting equipment.

In certain areas, the ethyl acetate is more readily obtainable than the formamide which again provides an advantage from the standpoint of cost and efficiency of operation, particularly with respect to the preferred form of this invention. It will, therefore, be apparent that the compositions of this invention provide significant improvements from an economy standpoint; however, it has also been found that the penetration strength readings are superior to those obtained with comparable compositions formed in accordance with the teachings of the Peeler patent.

In the compositions, the components consist exclusively of the silicate, amide, acetate and water with no other elements being present except in traces. Preferably, the silicate contents exceed 500 cc per liter of solution, and the ethyl acetate preferably comprises from one to one and one-half the amount of formamide. Equal parts ethyl acetate and formamide provide excellent results where these components make up about eight percent of a solution otherwise comprising 50 percent sodium silicate and 42 percent water.

The compositions described can be easily obtained since the mixing conditions are not critical. This advantage arises primarily due to the fact that a solution is formed and, therefore, there is no need to take special steps to provide homogeneity. In the use of the compositions, standard grouting techniques can be employed. In most instances, a bore is formed in the ground and conduits are utilized for passing the liquid into the ground. Openings may be provided in the side walls of the conduits and at the bottom to provide relatively uniform impregnation.

It will be understood that various changes and modifications may be made in the above described composition and method which provide the characteristics of the invention without departing from the spirit thereof, particularly as defined in the following claims.

That which is claimed is:

1. A grouting composition consisting, per liter of solution, of from 350 to 675 cc alkali metal silicate having an alkali metal oxide:silicon dioxide ratio of about 1:3 to 1:5 and having an alkali metal silicate solids content between 30 and 45 percent; from about 25 to 60 cc formamide; from 5 to 50 cc of ethyl acetate, and the balance water, said ethyl acetate being dissolved in said formamide and the combination of the formamide and ethyl acetate being present as a solute in said composition.

2. A composition in accordance with claim 1 wherein said alkali metal silicate comprises sodium silicate.

3. A grouting composition consisting, per liter of solution, of from 500 to 675 cc alkali metal silicate having an alkali metal oxide:silicon dioxide ratio of about 1:3 to 1:5 and having an alkali metal silicate solids content between 30 and 45 percent; formamide, ethyl acetate, and the balance water, said ethyl acetate being dissolved in said formamide and the combination of the formamide and ethyl acetate being present as a solute in said composition, said formamide and ethyl acetate each being present in amounts between 25 and 50 cc with the amount of ethyl acetate being approximately equal to the amount of formamide.

4. A composition in accordance with claim 3 wherein said alkali metal silicate comprises sodium silicate.

5. A method for the stabilization of soils comprising the steps of preparing a composition of the type set forth in claim 3, and contacting the soil with said composition.

* * * * *